(12) United States Patent
Ko

(10) Patent No.: US 8,711,228 B2
(45) Date of Patent: Apr. 29, 2014

(54) COLLABORATIVE IMAGE CAPTURE

(75) Inventor: Anthony Hok Tsung Ko, Sylvania Waters (AU)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 13/309,422

(22) Filed: Dec. 1, 2011

(65) Prior Publication Data

US 2012/0154608 A1    Jun. 21, 2012

(30) Foreign Application Priority Data

Dec. 15, 2010    (AU) .............................. 2010257231

(51) Int. Cl.
*H04N 5/225*    (2006.01)
*H04N 5/76*    (2006.01)
*G06K 9/60*    (2006.01)

(52) U.S. Cl.
USPC ............... 348/207.11; 348/231.2; 382/305; 382/306

(58) Field of Classification Search
USPC ............ 382/103, 170, 175, 180, 216, 284, 382/305–306, 162–167, 260–266, 254–255, 382/274–276; 348/207.11, 231.2
See application file for complete search history.

(56) References Cited

U.S. PATENT DOCUMENTS

| | | | |
|---|---|---|---|
| 6,301,440 B1 | 10/2001 | Bolle et al. | |
| 6,324,545 B1 | 11/2001 | Morag | |
| 7,327,905 B2 | 2/2008 | Tsue et al. | |
| 7,545,958 B2 | 6/2009 | Ohmura et al. | |
| 7,715,586 B2 | 5/2010 | Issa et al. | |
| 8,237,819 B2 * | 8/2012 | Shkurko et al. | 348/239 |
| 2004/0054659 A1 * | 3/2004 | McIntyre | 707/3 |
| 2004/0174434 A1 | 9/2004 | Walker et al. | |
| 2005/0007468 A1 * | 1/2005 | Stavely et al. | 348/239 |
| 2005/0128518 A1 * | 6/2005 | Tsue et al. | 358/1.15 |
| 2005/0134933 A1 * | 6/2005 | Tsue et al. | 358/437 |
| 2005/0228683 A1 * | 10/2005 | Saylor et al. | 705/1 |
| 2006/0198559 A1 | 9/2006 | Manico et al. | |
| 2007/0242138 A1 | 10/2007 | Manico et al. | |
| 2008/0030599 A1 * | 2/2008 | Stavely et al. | 348/239 |
| 2009/0225191 A1 | 9/2009 | Tachikawa et al. | |
| 2009/0244357 A1 | 10/2009 | Huang | |
| 2010/0235312 A1 | 9/2010 | McCullough et al. | |
| 2011/0029635 A1 * | 2/2011 | Shkurko et al. | 709/217 |
| 2011/0157227 A1 | 6/2011 | Ptucha et al. | |

FOREIGN PATENT DOCUMENTS

| | | |
|---|---|---|
| CN | 1589050 A | 3/2005 |
| CN | 1602094 A | 3/2005 |

(Continued)

*Primary Examiner* — Timothy J Henn
*Assistant Examiner* — Pritham Prabhakher
(74) *Attorney, Agent, or Firm* — Canon USA Inc. IP Division

(57) ABSTRACT

A method of populating a placeholder of a document as images are captured by one or more image capture devices. A reference image is captured using the image capture device with a first set of capture settings. The reference image is inserted into a placeholder of a document. Target characteristics of a subsequent image to be captured are determined using one of the image capture devices. The target characteristics are determined based the reference image and at least one remaining placeholder in the document. A second set of capture settings are determined based on the determined target characteristics. The second set of capture settings are communicated to at least one of the image capture devices in order to enable the at least one image capture device to capture the subsequent image with the second set of capture settings. A placeholder of the document is populated with the subsequent image.

13 Claims, 10 Drawing Sheets

(56) References Cited

FOREIGN PATENT DOCUMENTS

| | | |
|---|---|---|
| CN | 100356781 C | 12/2007 |
| CN | 101119430 A | 2/2008 |
| JP | 2003-125321 A | 4/2003 |
| JP | 2003125321 A | 4/2003 |
| JP | 2006101173 A | 4/2006 |

* cited by examiner

COLLABORATIVE IMAGE CAPTURE

REFERENCE TO RELATED PATENT APPLICATION(S)

This application claims the benefit under 35 U.S.C. §119 of the filing date of Australian Patent Application No. 2010257231, filed Dec. 15, 2010, hereby incorporated by reference in its entirety as if fully set forth herein.

TECHNICAL FIELD

The current invention relates generally to assisted image capture and, in particular, a method and apparatus for populating placeholders of a document as images are captured by an image capture device. The present invention also relates to a computer program product including a computer readable medium having recorded thereon a computer program for populating placeholders of a document as images are captured by an image capture device.

BACKGROUND

Many people capture images to create mementos or photo albums and to use those images as a gift for family and friends or as a means to archive their memories. Photo albums and photo books in particular are used to present images captured of an event in a pictorial narrative. Documents such as photo albums and photo books have become very powerful presentation media for sharing memories with other people.

The advent of digital photography has dramatically altered image capturing behaviour. For example, features such as instant preview are now possible. Further, the massive storage size of digital media makes it possible for a particular person to capture a nearly limitless number of images. As a result, image capturing has now become primarily about ensuring that an event is captured faithfully and sufficiently.

However, the increase in the number of captured images has increased the time spent filtering "good" images from "bad" images in order to ultimately select the best images for archival or sharing in a final presentation form. Hence, there is a clear distinction between the image capture stage and the presentation medium creation and presentation stage.

Without a view of a final presentation medium a user often lacks the context of where each captured image will be used in the final presentation medium (e.g., a photo book or photo album). In the example of a photo book, specific issues such as layout will depend on the images available to the user. The user may modify the layout of the photo book to suit the images. However, it will usually not be possible for the user to re-capture images once the images are in the photo book creation stage. In some cases, the user may find that they do not have sufficient images to fill a photo book. In other cases, the user may find that they do not have the right images to sufficiently present a good narrative or the narrative the user had in mind. Such cases may lead to the user feeling dissatisfied with their completed photo book.

Some known image capture devices provide assistance during the image capture stage to ensure that the user captures good quality images. One such device performs scene analysis of a current scene being viewed through the viewfinder. The device may also perform scene analysis on the captured image. Some of these known devices also use image processing algorithms to determine the quality of an image and translate this information to direct the user on how to achieve an optimal result by changing the appropriate settings on the device. Others of these devices send a request, over a wireless network, for real-time feedback on an image captured by a remote third party user. The disadvantage of the methods used by the above devices is that typically the quality analysis is performed only on pixel data and/or metadata for a captured image.

In one known method, an analysis is performed on a collection of images to determine a presentation format for the images. This known method uses a number of algorithms which may analyse and compare a number of different image parameters (e.g. colour ratio, texture, geo-location, capture time, etc.) to determine a set of relationships between the images. The determined relationships may then be grouped into story elements or "themes" which are utilised to assist in the presentation format of a final presentation medium (e.g. photo book). Determining a presentation format for the images can produce more aesthetically pleasing results with the available images. However, there still may be problems where there are insufficient images to complete a photo book or to convey a narrative.

Another increasing trend amongst users is collaborating in the capturing of images and in the creation of memorabilia. With each participant in such a collaboration having potentially different cameras with different capabilities and also different approaches to image capture, the result of the collaboration often produces a result that appears inconsistent in terms of layout. For example, a user may choose to compensate for low light by increasing an ISO setting of a camera, while another user may choose to use an in-built flash. In another example, users may choose different white balance settings on each of the cameras that they are using in a collaboration. In such scenarios, a viewer of the images can generally determine that the images have been captured from different devices. One of the disadvantages of collaboration is that often photos from a particular scene appear to originate from different events. Further, without some direction provided for a collaboration group often events are not sufficiently covered.

SUMMARY

It is an object of the present invention to substantially overcome, or at least ameliorate, one or more disadvantages of existing arrangements.

Disclosed are arrangements which seek to address the above problems by augmenting an image capturing stage with real-time assistance that utilises information about the presentation format for images to be captured to ensure that an optimal result is achieved.

According to one aspect of the present invention there is provided a method of populating a placeholder of a document as images are captured by at least two image capture devices, said method comprising:

receiving a reference image captured using a first image capture device configured to operate in accordance with a first set of capture settings;

inserting the reference image into a placeholder of a document;

determining target characteristics of a subsequent image to be captured using a second image capture device, the target characteristics being determined based on characteristics of the reference image and characteristics of at least one remaining placeholder in the document;

determining a second set of capture settings for the second image capture device based on the determined target characteristics;

communicating the second set of capture settings to the second image capture device in order to enable the second image capture device to capture the subsequent image in accordance with the second set of capture settings; and populating a placeholder of the document with the subsequent image.

According to another aspect of the present invention there is provided an apparatus for populating a placeholder of a document as images are captured by at least two image capture devices, said apparatus comprising:

means for receiving a reference image captured using a first image capture device configured to operate in accordance with a first set of capture settings;

means for inserting the reference image into a placeholder of a document;

means for determining target characteristics of a subsequent image to be captured using a second image capture device, the target characteristics being determined based on characteristics of the reference image and characteristics of at least one remaining placeholder in the document;

means for determining a second set of capture settings for the second image capture device based on the determined target characteristics;

means for communicating the second set of capture settings to the second image capture device in order to enable the second image capture device to capture the subsequent image in accordance with the second set of capture settings; and populating a placeholder of the document with the subsequent image.

According to still another aspect of the present invention there is provided a system for populating a placeholder of a document as images are captured by at least two image capture devices, said system comprising:

a memory for storing data and a computer program;

a processor coupled to said memory for executing said computer program, said computer program comprising instructions for:

receiving a reference image captured using a first image capture device configured to operate in accordance with a first set of capture settings;

inserting the reference image into a placeholder of a document;

determining target characteristics of a subsequent image to be captured using a second image capture device, the target characteristics being determined based on characteristics of the reference image and characteristics of at least one remaining placeholder in the document;

determining a second set of capture settings for the second image capture device based on the determined target characteristics;

communicating the second set of capture settings to the second image capture device in order to enable the second image capture device to capture the subsequent image in accordance with the second set of capture settings; and populating a placeholder of the document with the subsequent image.

According to still another aspect of the present invention there is provided a computer readable medium having a computer program stored thereon for populating a placeholder of a document as images are captured by at least two image capture devices, said program comprising:

code for receiving a reference image captured using a first image capture devices configured to operate in accordance with a first set of capture settings;

code for inserting the reference image into a placeholder of a document;

code for determining target characteristics of a subsequent image to be captured using a second image capture device, the target characteristics being determined based on characteristics of the reference image and characteristics of at least one remaining placeholder in the document;

code for determining a second set of capture settings for the second image capture device based on the determined target characteristics;

code for communicating the second set of capture settings to the second image capture device in order to enable the second image capture device to capture the subsequent image in accordance with the second set of capture settings; and code for populating a placeholder of the document with the subsequent image.

According to still another aspect of the present invention there is provided a method of populating a placeholder of a document as images are captured by an image capture device, said method comprising:

receiving a reference image captured using an image capture device configured to operate in accordance with a first set of capture settings;

inserting the reference image into a placeholder of a document;

determining target characteristics of a subsequent image to be captured using the image capture device, the target characteristics being determined based on characteristics of the reference image and characteristics of at least one remaining placeholder in the document;

determining a second set of capture settings for the image capture device based on the determined target characteristics;

communicating the second set of capture settings to the image capture device in order to enable the image capture device to capture the subsequent image in accordance with the second set of capture settings; and populating a placeholder of the document with the subsequent image.

According to still another aspect of the present invention there is provided an apparatus for populating a placeholder of a document as images are captured by an image capture device, said apparatus comprising:

means for receiving a reference image captured using an image capture device configured to operate in accordance with a first set of capture settings;

means for inserting the reference image into a placeholder of a document;

means for determining target characteristics of a subsequent image to be captured using the image capture device, the target characteristics being determined based on characteristics of the reference image and characteristics of at least one remaining placeholder in the document;

means for determining a second set of capture settings for the second image capture device based on the determined target characteristics;

means for communicating the second set of capture settings to the image capture device in order to enable the image capture device to capture the subsequent image in accordance with the second set of capture settings; and populating a placeholder of the document with the subsequent image.

According to still another aspect of the present invention there is provided a system for populating a placeholder of a document as images are captured by an image capture device, said system comprising:

a memory for storing data and a computer program;

a processor coupled to said memory for executing said computer program, said computer program comprising instructions for:

receiving a reference image captured using an image capture device configured to operate in accordance with a first set of capture settings;

inserting the reference image into a placeholder of a document;

determining target characteristics of a subsequent image to be captured using the image capture device, the target characteristics being determined based on characteristics of the reference image and characteristics of at least one remaining placeholder in the document;

determining a second set of capture settings for the image capture device based on the determined target characteristics;

communicating the second set of capture settings to the image capture device in order to enable the image capture device to capture the subsequent image in accordance with the second set of capture settings; and populating a placeholder of the document with the subsequent image.

According to still another aspect of the present invention there is provided a computer readable medium having a computer program stored thereon for populating a placeholder of a document as images are captured by an image capture devices, said program comprising:

code for receiving a reference image captured using an image capture device configured to operate in accordance with a first set of capture settings;

code for inserting the reference image into a placeholder of a document;

code for determining target characteristics of a subsequent image to be captured using the image capture device, the target characteristics being determined based on characteristics of the reference image and characteristics of at least one remaining placeholder in the document;

code for determining a second set of capture settings for the image capture device based on the determined target characteristics;

code for communicating the second set of capture settings to the image capture device in order to enable the image capture device to capture the subsequent image in accordance with the second set of capture settings; and code for populating a placeholder of the document with the subsequent image.

Other aspects of the invention are also disclosed.

BRIEF DESCRIPTION OF THE DRAWINGS

One or more embodiments of the invention will now be described with reference to the following drawings, in which.

DETAILED DESCRIPTION OF EMBODIMENTS OF THE INVENTION

Figure 1:
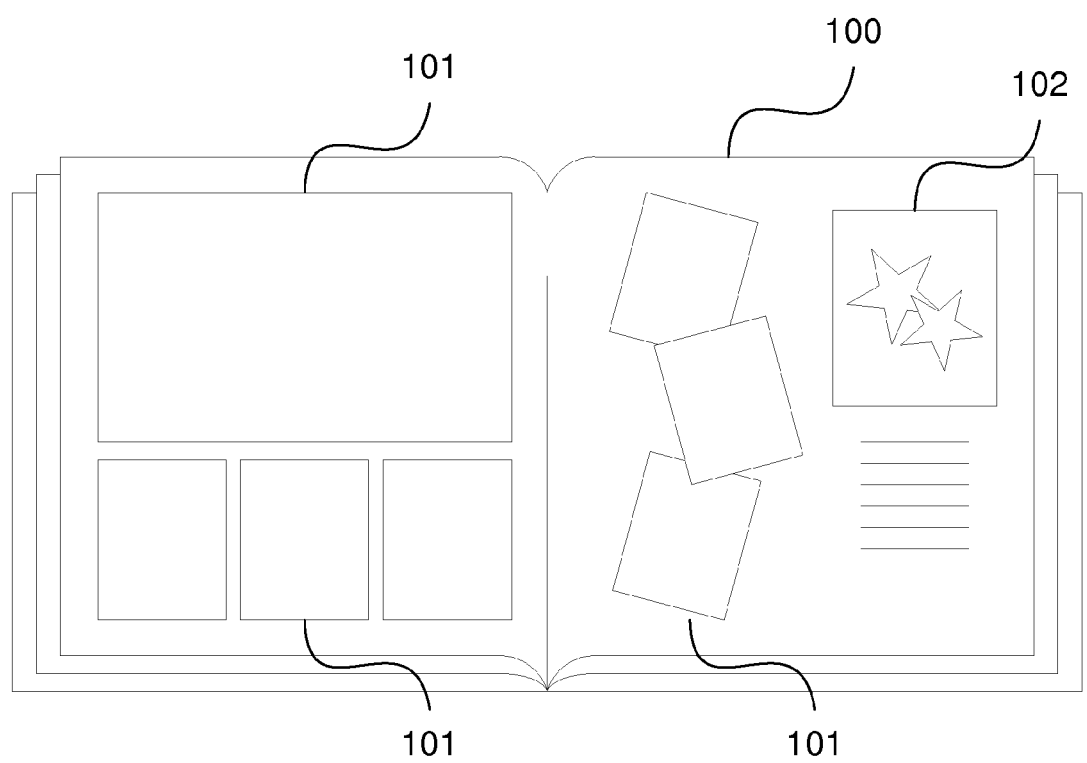
FIG. 1 is a diagram showing a photo book containing placeholders for images.

Where reference is made in any one or more of the accompanying drawings to steps and/or features, which have the same reference numerals, those steps and/or features have for the purposes of this description the same function(s) or operation(s), unless the contrary intention appears.

The term "document" as described below may refer to any presentation medium for displaying a set of images. The presentation medium may include any physical medium such as, for example, photo books, postcards and collages. For ease of explanation, the document used in the example described below is a photo book 100 as seen in FIG. 1.

However, it is not intended that the methods described below be limited to photo books or even physical media. For example, the described methods may have application to documents in the form of non-physical media including digital slideshows, digital postcards and digital collages.

The term "photo book" as described below refers to a document in the form of a photo album created using one or more software application programs 833 and 933 (see FIGS. 8A, 8B, 9A and 9B) to sort, select and arrange digital images onto each page of the photo book using a book-like interface. The software application programs 833 and 933 will be described in detail below. The digital representation of a photo album created by the described software application programs 833 and 933 can be printed and constructed into a book resembling a traditional photo album. A method 500 of populating placeholders of a document will described below with reference to FIG. 5. A method 600 of determining recommendation data, for use in the method 500, will be described below with reference to FIG. 6.

FIG. 1 is a diagram showing a document in the form of a photo book 100 as the photo book is represented in a user interface generated by the described software application program 833 in accordance with the described methods 500 and 600. To assist the user in creating the photo book 100, the software application program 833 may define a set of page templates. A page template is a set of rules for a predefined page layout. The page template consists of placeholders, such as the placeholders 101, where each placeholder (e.g., 101) is a logical container for an image to be inserted. The page template may also include other elements on a page that will affect the layout of the page. For example, static images and text 102 may be defined for a page of the page template. Page templates are generally created by photo book designers who are skilled in layout and graphic design.

Figure 2A:
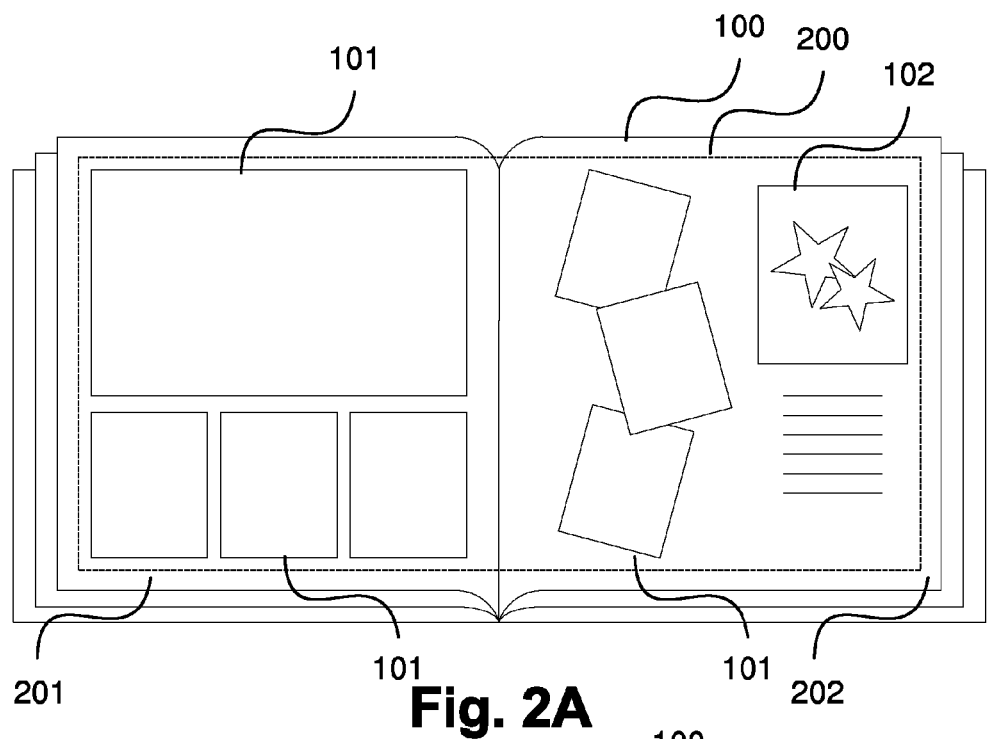
FIG. 2A is a diagram showing the photo book of FIG. 1 with a highlighted (i.e., in phantom lines) document section.

FIG. 2A is a diagram showing a "section" 200 (i.e., in phantom lines) within the document (i.e., the photo book 100). A section, such as the section 200, is a logical grouping to denote a relationship or theme between a set of page elements (e.g. placeholders). In the example of FIG. 2A, the section 200 spans across two pages 201, 202 of the photo book 100. The section 200 includes all the placeholders (e.g., 101) and static images and text (e.g., 102) encapsulated in the pages 201, 202 of the photo book 100. However, a section may span a single page or multiple pages. Typically, the number of pages spanned by a section will be pre-defined by a designer or provider of the document 100 prior to a corresponding document template being provided to a user for inserting captured images. A section is a tool for the designer to assist users during a photo book editing process to select images that have a strong semantic and visual relationship for each section. For example, the user may wish to insert images of family members into one section while images of friends or other locations can be moved to another section.

As will be described in detail below, the characteristics of a placeholder (e.g., 101) may be pre-defined by a designer when designing the document 100. In particular, weighted parameter values may be introduced into a page template to denote the strength of a relationship, either visually or semantically, between image placeholders (e.g., 101).

As described below, a single "reference" image may be used as the basis of comparison for all other images being used by the user to create the document 100 (i.e., the photo book). In one implementation, a pair-wise comparison may also be performed between each of the images being used to create the photo book 100 and the reference image.

Figure 2B:
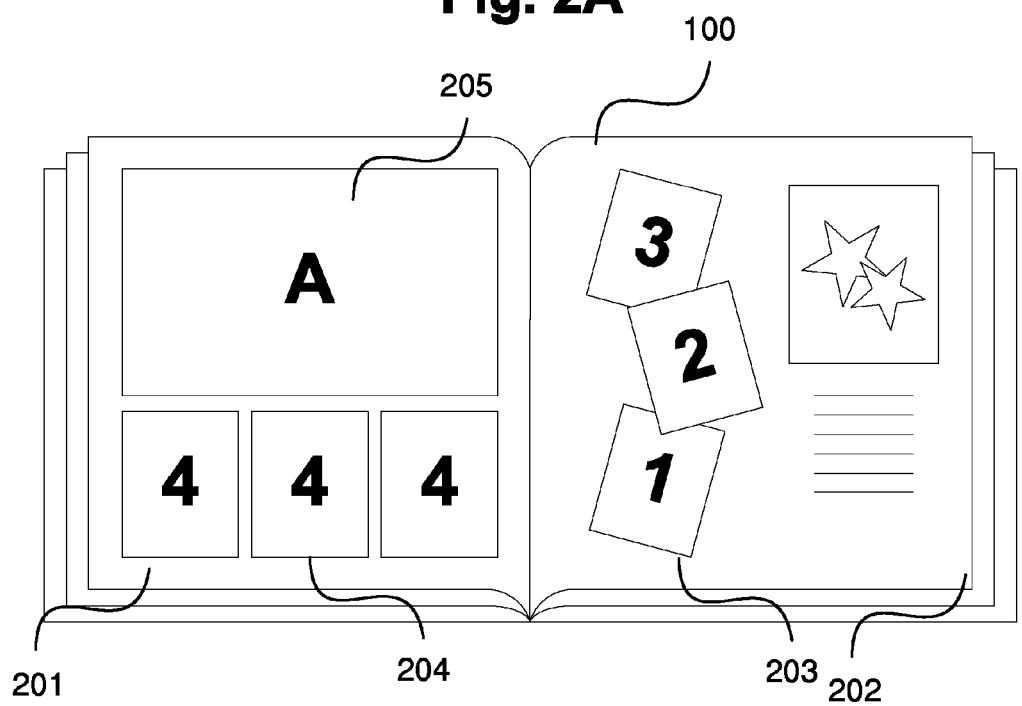
FIG. 2B is a diagram showing the photo book of FIG. 1 with weighted values denoting relationship strength relative to a reference image denoted by a symbol 'A'.

In each section (e.g., the section 200) of the photo book 100, one placeholder is designated as the reference image placeholder where the reference image will be placed. In FIG. 2B, the placeholder 205 is designated as the reference image placeholder. All other placeholders (e.g., 201, 204, 203) in the section 200 are assigned a weighted parameter value relative to the reference image placeholder 201 to denote the strength of the relationship between the particular placeholder (e.g., 203) and the reference image placeholder 201. In one implementation, a higher magnitude weighted parameter value represents a stronger relationship or higher relevance/priority between a particular placeholder and the reference image placeholder 205. Placeholders with equal value have equal relationship (or relevance).

In the example of FIG. 2B, weighted parameter values are assigned to placeholders (e.g., 101) based on spatial information. For example, placeholders (e.g., the placeholder 204) on the same page 201 and below the reference image placeholder 205 have the highest weight value whereas placeholders 203 on the opposite page 202 are further away and have an increasingly lower relationship strength. Other methods for assigning weighted values to placeholders are possible and may be manually set (or predefined) by a designer. Assigning weighted values to image placeholders may be performed during the design stage of a page template. Accordingly, the weighted parameter values are pre-defined. Assigning weighted parameter values to image placeholders during the design stage is more rigid and gives the user less freedom to change the layout of their images. Alternatively, the user may choose the placeholder 205 within the section 200 as the reference image placeholder during the image capture stage and apply spatial information to reassign weighted values to at least one of the remaining placeholders (e.g., 204) in the section 200.

Figure 3:
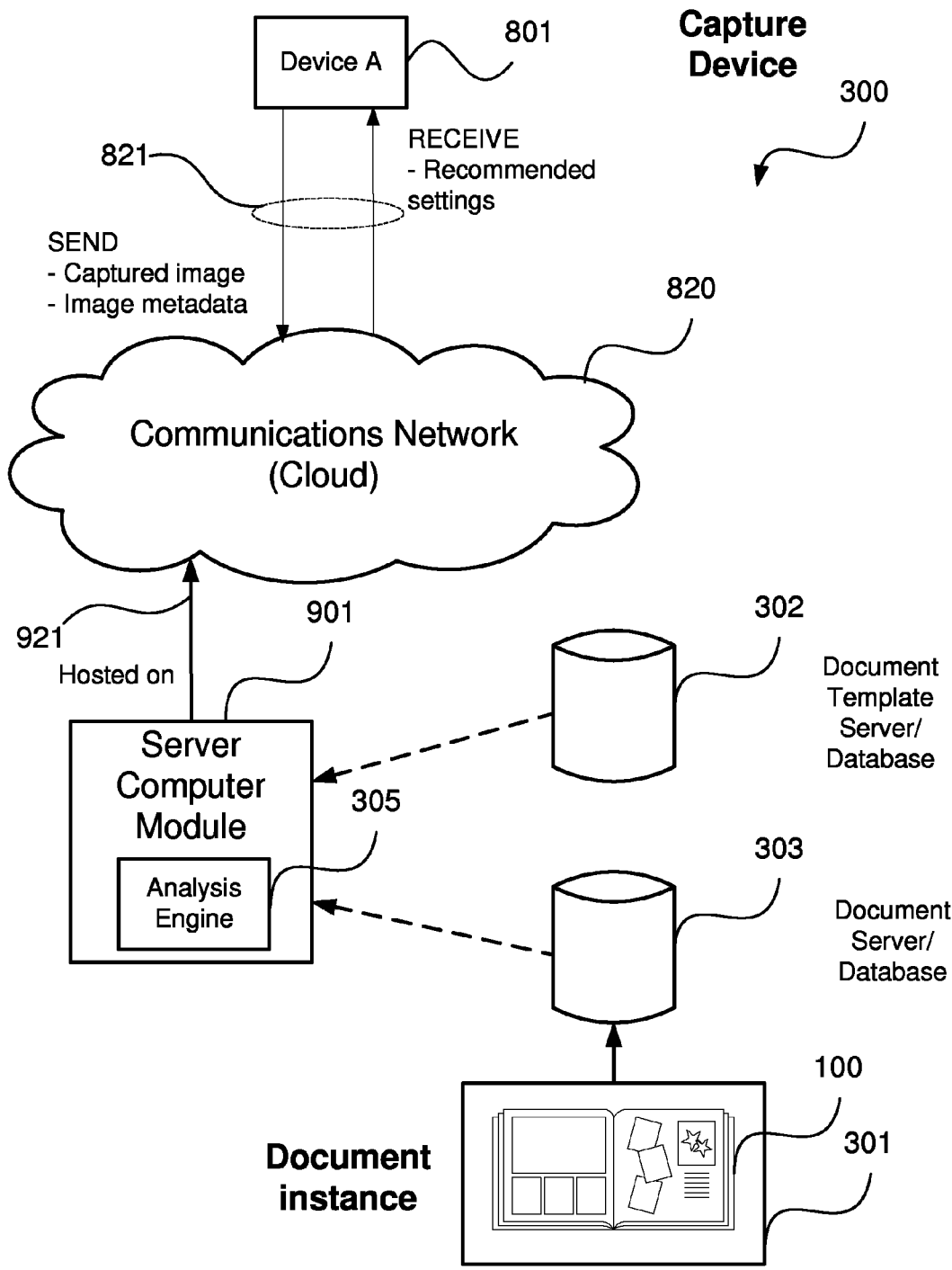
FIG. 3 is a schematic block diagram showing a system for creating a document.

FIG. 3 is a schematic diagram showing a system 300 for creating a document. The system 300 is described by way of example with reference to creating a document in the form of the photo book 100. The system 300 is configured to provide real-time feedback to the user regarding the creation of the document 100 during the image capturing stage.

The user interacts with the system 300 via a user interface displayed on an image capture device 801 being used by the user. In one implementation, software application programs and other components required for the system 300, as represented in FIG. 3, reside on the device 801, without the need of a network connection or server computer module 901 (see FIG. 9). However, as shown in FIG. 3, the system 300 is configured in accordance with a Cloud-based architecture where data processing is performed on a network (i.e., the Cloud) 820. In the example of FIG. 3, the image capture device 801 requires a network connection 821 (see FIGS. 8A and 8B), typically a wireless connection, to perform one or more steps in the methods described below.

Figure 8A:
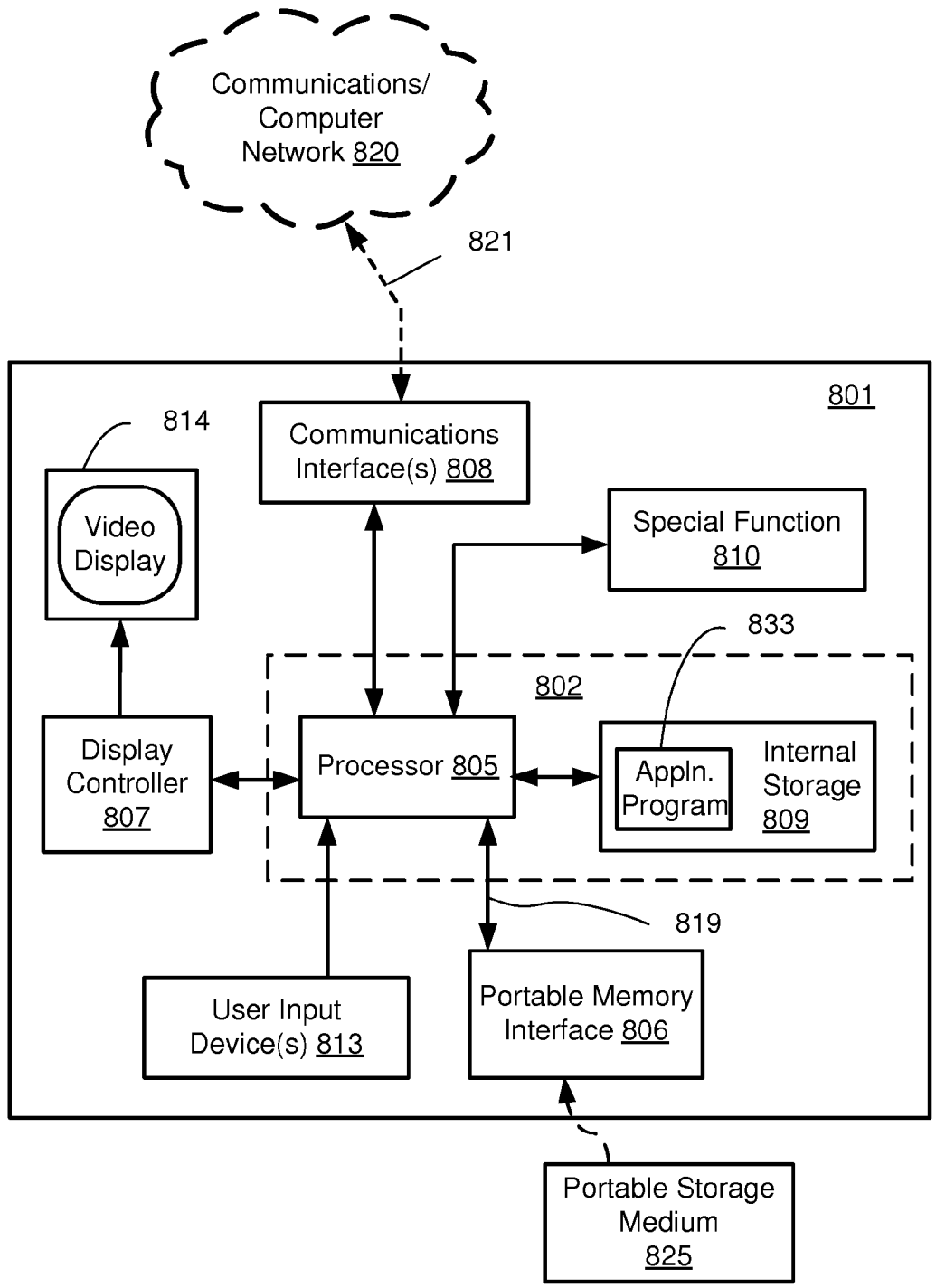
FIGS. 8A and 8B collectively form a schematic block diagram representation of an electronic device shown in FIG. 3.
Figure 8B:
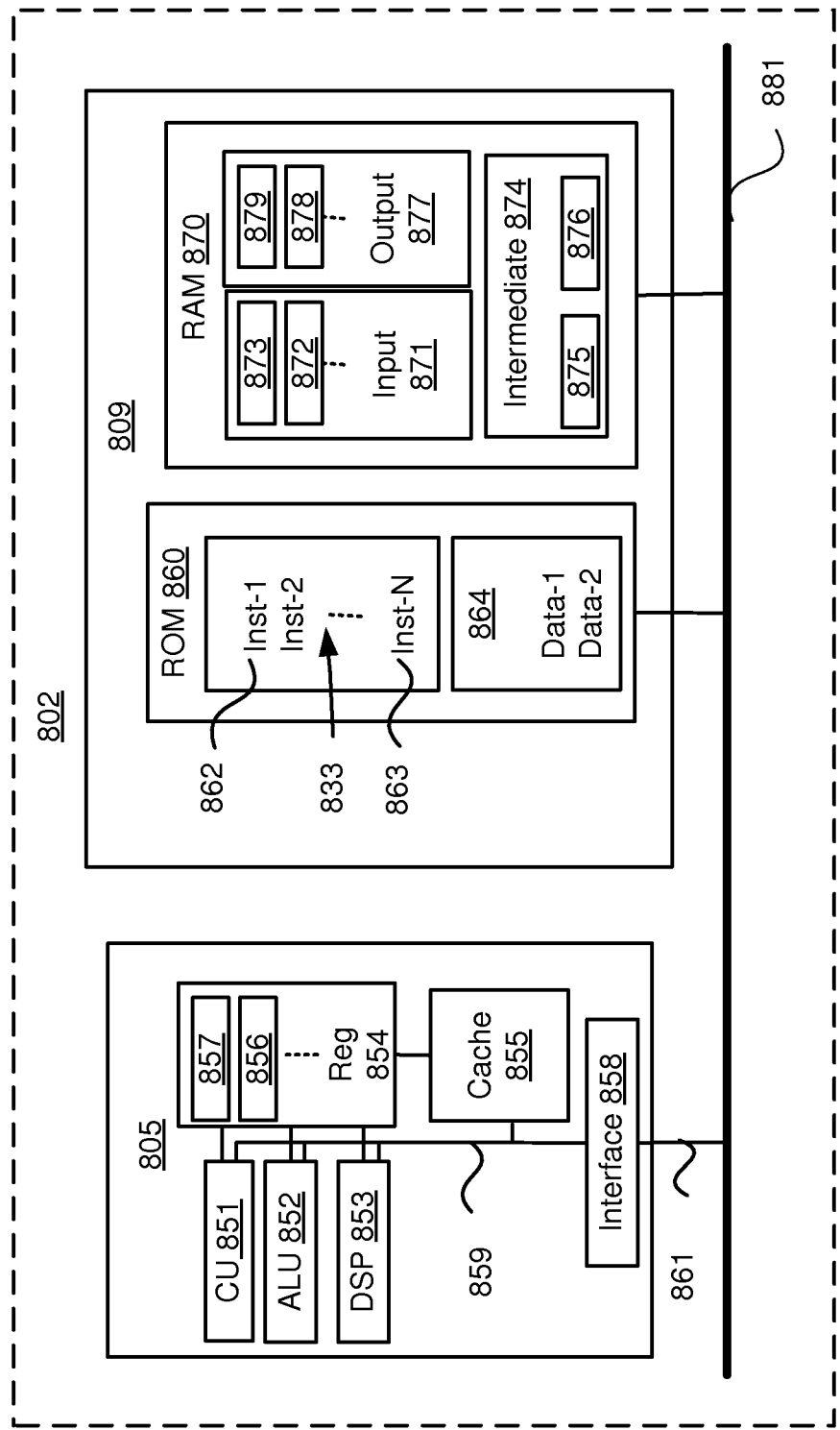

FIGS. 8A and 8B collectively form a schematic block diagram of the image capture device 801. As seen in FIGS. 8A and 8B, the device 801 is a general purpose electronic device 801 including embedded components, upon which one or more steps of the methods to be described are desirably practiced. The electronic device 801 may be, for example, a mobile phone, a portable media player or a digital camera, in which processing resources are limited. Nevertheless, the device 801 may be a higher-level devices such as a desktop computer, server computer, and other such devices with significantly larger processing resources.

As seen in FIG. 8A, the electronic device 801 comprises an embedded controller 802. Accordingly, the electronic device 801 may be referred to as an "embedded device." In the present example, the controller 802 has a processing unit (or processor) 805 which is bi-directionally coupled to an internal storage module 809. The storage module 809 may be formed from non-volatile semiconductor read only memory (ROM) 860 and semiconductor random access memory (RAM) 870, as seen in FIG. 8B. The RAM 870 may be volatile, non-volatile or a combination of volatile and non-volatile memory.

The device 801 includes a display controller 807, which is connected to a video display 814, such as a liquid crystal display (LCD) panel or the like. The display controller 807 is configured for displaying graphical images on the video display 814 in accordance with instructions received from the embedded controller 802, to which the display controller 807 is connected.

The device 801 also includes user input devices 813 which are typically formed by keys, a keypad or like controls. In some implementations, the user input devices 813 may include a touch sensitive panel physically associated with the display 814 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus. In the example, described below, the user input devices 813 include a shutter button.

As seen in FIG. 8A, the device 801 also comprises a portable memory interface 806, which is coupled to the processor 805 via a connection 819. The portable memory interface 806 allows a complementary portable memory device 825 to be coupled to the device 801 to act as a source or destination of data or to supplement the internal storage module 809. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The device 801 also has a communications interface 808 to permit coupling of the device 801 to the communications network 820, via a connection 821. The communications network 820 may be a wide-area network (WAN), such as the Internet, a cellular telecommunications network, or a private WAN. The communications interface 808 may also permit coupling of the device 801 to a computer. As described above, the connection 821 is typically wireless. For example, the connection 821 may be radio frequency or optical. Another example of wireless connection includes Bluetooth™ type local interconnection, Wi-Fi (including protocols based on the standards of the IEEE 802.11 family), Infrared Data Association (IrDa) and the like. However, the connection 821 may also be wired. An example of a wired connection includes Ethernet.

Typically, the device 801 is configured to perform some special function. The embedded controller 802, possibly in conjunction with further special function components 810, is provided to perform that special function. For example, where the device 801 is a digital camera, the components 810 may represent a lens, focus control and image sensor of the camera. The special function components 810 are connected to the embedded controller 802. As another example, the device 801 may be a mobile telephone handset. In this instance, the components 810 may represent those components required for communications in a cellular telephone environment. Where the device 801 is a portable device, the special function components 810 may represent a number of encoders and decoders of a type including Joint Photographic Experts Group (JPEG), (Moving Picture Experts Group) MPEG, MPEG-1 Audio Layer 3 (MP3), and the like.

The methods described below may be implemented using the embedded controller 802, where the one or more steps of the processes of FIGS. 1 to 7 may be implemented as one or more software code modules of the software application program 833 executable within the embedded controller 802. The device 801 of FIG. 8A implements one or more steps of the described methods. In particular, with reference to FIG. 8B, one or more of the steps of the described methods are effected by instructions of the software application program 833 that are carried out within the controller 802.

The software instructions may be formed as the one or more code modules, each for performing one or more particular tasks. The software application program 833 may also be divided into two separate parts, in which a first part and the corresponding code modules performs the described methods and a second part and the corresponding code modules manage the user interface between the first part and the user.

The software application program 833 of the embedded controller 802 is typically stored in the non-volatile ROM 860 of the internal storage module 809. The software application program 833 stored in the ROM 860 can be updated when required from a computer readable medium. The software application program 833 can be loaded into and executed by the processor 805. In some instances, the processor 805 may execute software instructions that are located in RAM 870. Software instructions may be loaded into the RAM 870 by the processor 805 initiating a copy of one or more code modules from ROM 860 into RAM 870. Alternatively, the software instructions of one or more code modules may be pre-installed in a non-volatile region of RAM 870 by a manufacturer. After one or more code modules have been located in RAM 870, the processor 805 may execute software instructions of the one or more code modules.

The software application program 833 is typically pre-installed and stored in the ROM 860 by a manufacturer, prior to distribution of the electronic device 801. However, in some instances, the software application program 833 may be supplied to the user encoded on one or more CD-ROM (not shown) and read via the portable memory interface 806 of FIG. 8A prior to storage in the internal storage module 809 or in the portable memory 825. In another alternative, the software application program 833 may be read by the processor 805 from the network 820, or loaded into the controller 802 or the portable storage medium 825 from other computer readable media. Computer readable storage media refers to any storage medium that participates in providing instructions and/or data to the controller 802 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 801. Examples of computer readable transmission media that may also participate in the provision of software, application programs, instructions and/or data to the device 801 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application program 833 and the corresponding code modules mentioned above may be executed to implement one or more graphical user interfaces (GUIs) to be rendered or otherwise represented upon the display 814 of FIG. 8A. Through manipulation of the user input device 813 (e.g., the keypad), a user of the device 801 and the application program 833 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 8B illustrates in detail the embedded controller 802 having the processor 805 for executing the software application program 833 and the internal storage 809. The internal storage 809 comprises read only memory (ROM) 860 and random access memory (RAM) 870. The processor 805 is able to execute the software application program 833 stored in one or both of the connected memories 860 and 870. When the electronic device 802 is initially powered up, a system program resident in the ROM 860 is executed. The application program 833 permanently stored in the ROM 860 is sometimes referred to as "firmware". Execution of the firmware by the processor 805 may fulfil various functions, including processor management, memory management, device management, storage management and user interface.

The processor 805 typically includes a number of functional modules including a control unit (CU) 851, an arithmetic logic unit (ALU) 852 and a local or internal memory comprising a set of registers 854 which typically contain atomic data elements 856, 857, along with internal buffer or cache memory 855. One or more internal buses 859 interconnect these functional modules. The processor 805 typically also has one or more interfaces 858 for communicating with external devices via system bus 881, using a connection 861.

The software application program 833 includes a sequence of instructions 862 though 863 that may include conditional branch and loop instructions. The software application program 833 may also include data, which is used in execution of the software application program 833. This data may be stored as part of the instruction or in a separate location 864 within the ROM 860 or RAM 870.

In general, the processor 805 is given a set of instructions, which are executed therein. This set of instructions may be organised into blocks, which perform specific tasks or handle specific events that occur in the electronic device 801. Typically, the software application program 833 waits for events and subsequently executes the block of code associated with that event. Events may be triggered in response to input from a user, via the user input devices 813 of FIG. 8A, as detected by the processor 805. Events may also be triggered in response to other sensors and interfaces in the electronic device 801.

The execution of a set of the instructions may require numeric variables to be read and modified. Such numeric variables are stored in the RAM 870. The methods described below use input variables 871 that are stored in known locations 872, 873 in the memory 870. The input variables 871 are processed to produce output variables 877 that are stored in known locations 878, 879 in the memory 870. Intermediate variables 874 may be stored in additional memory locations in locations 875, 876 of the memory 870. Alternatively, some intermediate variables may only exist in the registers 854 of the processor 805.

The execution of a sequence of instructions is achieved in the processor 805 by repeated application of a fetch-execute cycle. The control unit 851 of the processor 805 maintains a register called the program counter, which contains the address in ROM 860 or RAM 870 of the next instruction to be executed. At the start of the fetch execute cycle, the contents of the memory address indexed by the program counter is loaded into the control unit 851. The instruction thus loaded controls the subsequent operation of the processor 805, causing for example, data to be loaded from ROM memory 860 into processor registers 854, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

One or more steps or sub-processes in the processes of the methods described below may be associated with one or more segments of the software application program 833, and may be performed by repeated execution of a fetch-execute cycle in the processor 805 or similar programmatic operation of other independent processor blocks in the device 801.

Using the device 801, the user may create or trigger the creation of the document 100 before capturing images. The document 100 is derived from a document template which consists of page templates and other information required for specifying the attributes of the document 100. The document template may reside in a document template server database 302 as seen in FIG. 3. The database 302 may be configured within memory 906 (see FIG. 9) of the server computer module 901 connected to the network 820. An instance 301 of the document 100 is created from the document template and is stored in a document server database 303. Again, the document server database 303 may be configured within memory 906 (see FIG. 9) of the server computer module 901. The server computer module 901 forms a Cloud service for hosting the instance 301 of the document 100.

Figure 9:
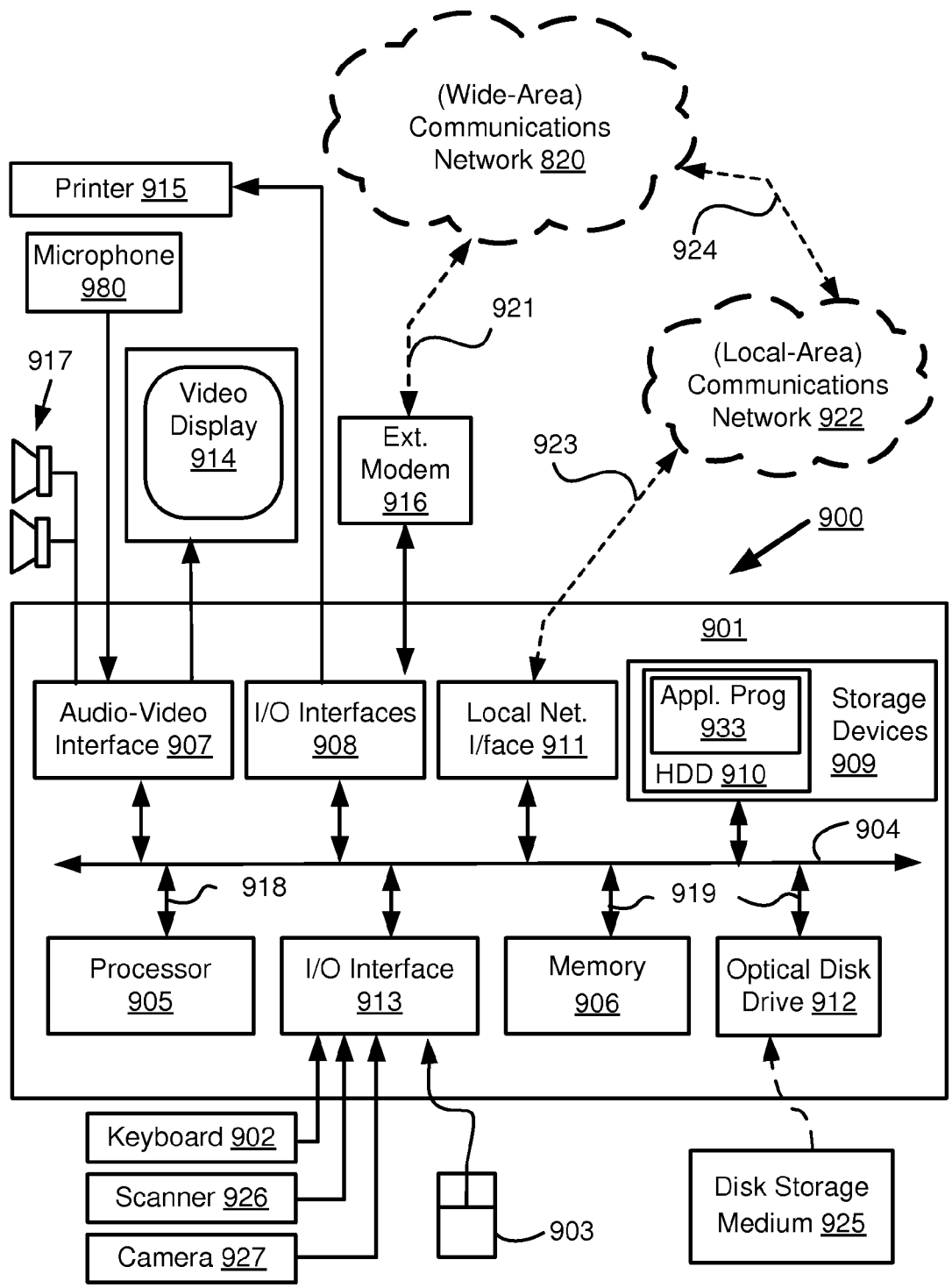
FIG. 9 forms a schematic block diagram of a general purpose computer system including a computer module upon which a server computer of FIG. 3 can be practiced.

FIG. 9 depicts a general-purpose computer system 900, including the server computer module 901, upon which one or more steps of the described methods can be practised.

As seen in FIG. 9A, the computer system 900 includes: the server computer module 901; input devices such as a keyboard 902, a mouse pointer device 903, a scanner 926, a camera 927, and a microphone 980; and output devices including a printer 915, a display device 914 and loudspeakers 917. An external Modulator-Demodulator (Modem) transceiver device 916 may be used by the server computer module 901 for communicating to and from the communications network 820 via a connection 921. As described above, the communications network 920 may be a wide-area network (WAN), such as the Internet, a cellular telecommunications network, or a private WAN. Where the connection 921 is a telephone line, the modem 916 may be a traditional "dial-up" modem. Alternatively, where the connection 921 is a high capacity (e.g., cable) connection, the modem 916 may be a broadband modem. A wireless modem may also be used for wireless connection to the communications network 920.

The server computer module 901 typically includes at least one processor unit 905, and a memory unit 906. For example, the memory unit 906 may have semiconductor random access memory (RAM) and semiconductor read only memory (ROM). The server computer module 901 also includes a number of input/output (I/O) interfaces including: an audio-video interface 907 that couples to the video display 914, loudspeakers 917 and microphone 980; an I/O interface 913 that couples to the keyboard 902, mouse 903, scanner 926, camera 927 and optionally a joystick or other human interface device (not illustrated); and an interface 908 for the external modem 916 and printer 915. In some implementations, the modem 916 may be incorporated within the server computer module 901, for example within the interface 908. The server computer module 901 also has a local network interface 911, which permits coupling of the computer system 900 via a connection 923 to a local-area communications network 922, known as a Local Area Network (LAN). As illustrated in FIG. 9, the local communications network 922 may also couple to the wide network 820 via a connection 924, which would typically include a so-called "firewall" device or device of similar functionality. The local network interface 911 may comprise an Ethernet™ circuit card, a Bluetooth™ wireless arrangement or an IEEE 802.11 wireless arrangement; however, numerous other types of interfaces may be practiced for the interface 911.

The I/O interfaces 908 and 913 may afford either or both of serial and parallel connectivity, the former typically being implemented according to the Universal Serial Bus (USB) standards and having corresponding USB connectors (not illustrated). Storage devices 909 are provided and typically include a hard disk drive (HDD) 910. Other storage devices such as a floppy disk drive and a magnetic tape drive (not illustrated) may also be used. An optical disk drive 912 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 900.

The components 905 to 913 of the server computer module 901 typically communicate via an interconnected bus 904 and in a manner that results in a conventional mode of operation of the computer system 900 known to those in the relevant art. For example, the processor 905 is coupled to the system bus 904 using a connection 918. Likewise, the memory 906 and optical disk drive 912 are coupled to the system bus 904 by connections 919. Examples of computers on which the server computer module 901 can be practised include IBM-PC's and compatibles, Sun Sparcstations, Apple Mac™ or a like computer systems.

The described methods may be implemented using the computer system 900 wherein one or more steps of the processes of FIGS. 1 to 7, to be described, may be implemented as one or more software application programs 933 executable within the computer system 900. In particular, one or more steps of the described methods may be effected by instructions in a software application program 933 that are carried out within the server computer module 901. The software instructions 931 may be formed as one or more code modules, each for performing one or more particular tasks. The software may also be divided into two separate parts, in which a first part and the corresponding code modules performs one or more of the steps of the described methods and a second part and the corresponding code modules manage a user interface between the first part and the user.

The software may be stored in a computer readable medium, including the storage devices described below, for example. The software is loaded into the computer system 900 from the computer readable medium, and then executed by the server computer system 900. A computer readable medium having such software or computer program recorded on the computer readable medium is a computer program product. The use of the computer program product in the computer system 900 preferably effects an advantageous apparatus for implementing the described methods.

The software application program 933 is typically stored in the HDD 910 or the memory 906. The software application program 933 may be loaded into the computer system 900 from a computer readable medium, and executed by the computer system 900. Thus, for example, the software 933 may be stored on an optically readable disk storage medium (e.g., CD-ROM) 925 that is read by the optical disk drive 912. A computer readable medium having such software or computer program recorded on it is a computer program product. The use of the computer program product in the computer system 900 preferably effects an apparatus for implementing one or more steps of the described methods.

In some instances, the application program 933 may be supplied to the user encoded on one or more CD-ROMs 925 and read via the corresponding drive 912, or alternatively may be read by the user from the networks 920 or 922. Still further, the software may also be loaded into the computer system 900 from other computer readable media. Computer readable storage media refers to any storage medium that provides recorded instructions and/or data to the computer system 900 for execution and/or processing. Examples of such storage media include floppy disks, magnetic tape, CD-ROM, DVD, Blu-ray Disc, a hard disk drive, a ROM or integrated circuit, USB memory, a magneto-optical disk, or a computer readable card such as a PCMCIA card and the like, whether or not such devices are internal or external of the server computer module 901. Examples of computer readable transmission media that may also participate in the provision of software, application programs, instructions and/or data to the server computer module 901 include radio or infra-red transmission channels as well as a network connection to another computer or networked device, and the Internet or Intranets including e-mail transmissions and information recorded on Websites and the like.

The second part of the application program 933 and the corresponding code modules mentioned above may be executed to implement one or more graphical user interfaces (GUIs) to be rendered or otherwise represented upon the display 914. Through manipulation of typically the keyboard 902 and the mouse 903, a user of the computer system 900 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 917 and user voice commands input via the microphone 980.

A representation of the document instance 301 stored on the document server database 303 is sent (or communicated) to the capture device 801 so that the document 100 can be previewed by the user on the device 801. The user may also interact with the document 100 remotely from the device 801 and perform edit functions. For example, the user may upload the document 100 to a desktop computer or the like to perform the edit functions. All modifications to the document 100 displayed on the device 801 are synchronized with the document instance stored in the document server database 303. As described in more detail below, when an image is captured using the device 801, the pixel data and metadata (e.g. camera settings, geo-location) of the captured image, is uploaded to the server computer module 901 hosting the document instance 301 for the document 100. The server computer module 901 receiving the captured image retrieves the stored document instance 301 from the document server database 303 and performs analysis in relation to the captured image to determine where the captured image is to be inserted in the document 100. The analysis may be performed by one or more software code modules of the software application program 933. The code modules of the software application program 933 performing the analysis may be referred to as an "analysis engine" 305 as shown in FIG. 3.

As described in more detail below, based on information provided from the analysis engine 305 after the captured image has been analysed, the server computer module 901 prepares recommendation data. The recommendation data represents a recommendation on a subsequent image to capture. The recommendation data is communicated (or sent back) to the device 801 via the communications network 820. The recommendation data may be related specifically to a next empty placeholder (or at least one remaining placeholder) in the retrieved document instance 301. The recommendation data may also include semantic information about a subject to capture in the subsequent image or camera settings (e.g., Flash setting, White Balance Cloudy, ISO setting) to ensure image quality of the subsequent image.

Figure 4:
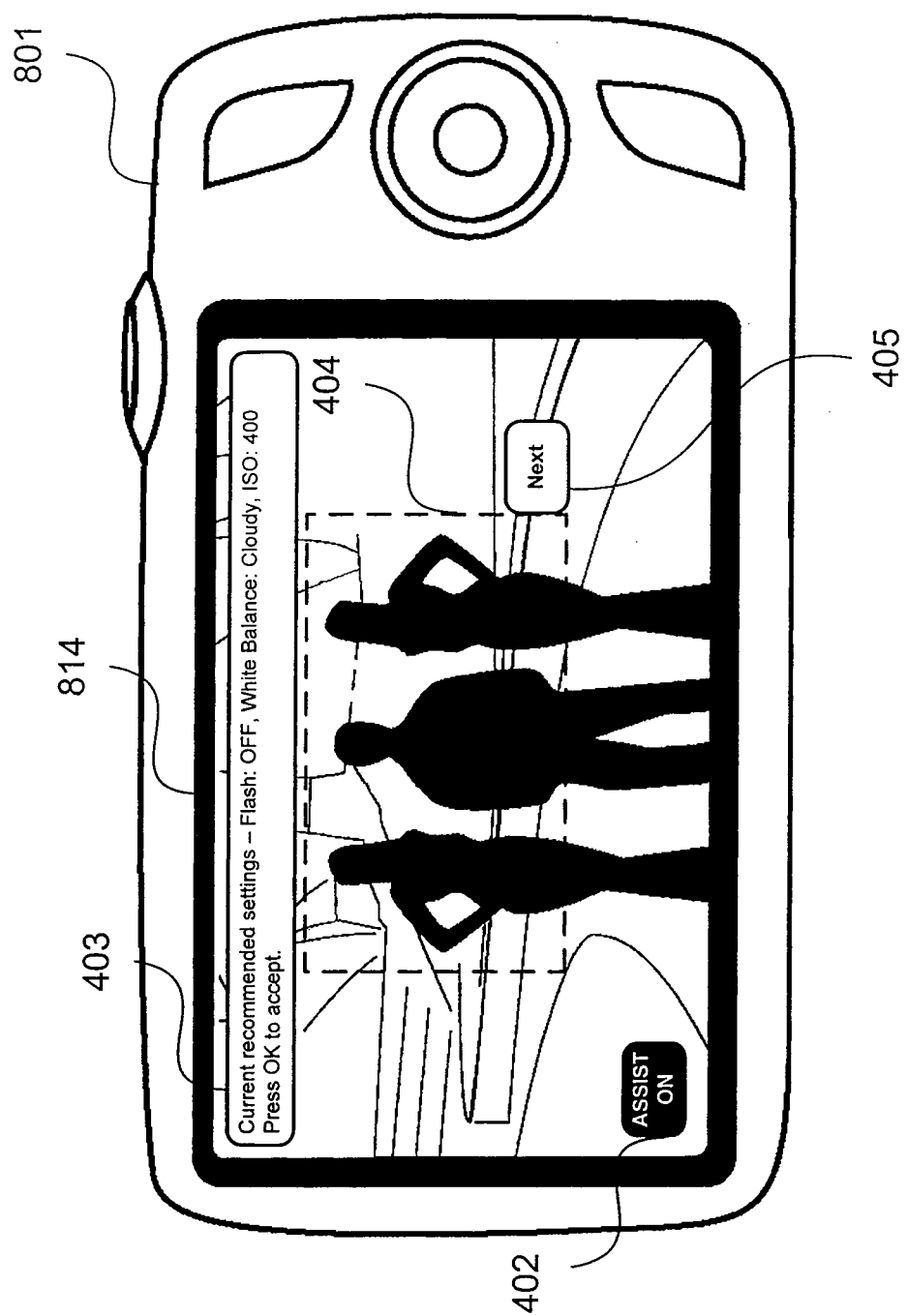
FIG. 4 is a diagram showing a display of a capture device of FIG. 3 showing recommendation data displayed on the display.

FIG. 4 shows the video display 814 of the capture device 801 with an example of recommendation data displayed on the video display 814. In the example of FIG. 4, the recommendation data is in the form of a frame 404 (i.e., in phantom lines) directing the user to capture an image containing suggested subjects. The recommendation data is also in the form of a text box 403 containing recommended capture settings for the device 801 for capturing a subsequent image in order to ensure optimal image quality.

As seen in FIG. 4, the display 814 shows a live view of a scene to be captured in the image including a subject in the form of three people. In one implementation, as seen in FIG. 4, to enable real-time assistance as described herein, the user sets the device 801 to "ASSIST mode" as indicated by icon 402. The device 801 may be set to "ASSIST mode by the user using the user input devices 813. Enabling the ASSIST mode initiates the described methods 500 and 600 so as to provide assisted image capture and assisted document creation. If the ASSIST mode is not enabled, then the user will manually insert images that are captured into the document 100.

As described above, recommendation data comprises device setting (or capture setting) recommendations as defined by the text box 403 in FIG. 4. The recommendation data also comprises a subject recommendation as defined by the frame 404. When the image capture device 401 is set to live view and ASSIST mode is enabled, then the text box 403 is displayed on the display 814 over the live view of the scene.

The text box 403 comprises recommended device settings (or capture settings) for capturing a subsequent image. In the present example of FIG. 4, the recommended device settings are "Flash: OFF" (i.e., Turn off flash), "White Balance Cloudy" (i.e., change white balance setting) and "ISO: 400" (i.e., change ISO setting). The recommended device settings are determined in accordance with the described methods to ensure a good consistent layout when the captured image is inserted into the document 100. For example, the recommended device settings are determined to ensure that the colour ratio and texture of the subsequent image inserted into a placeholder (e.g., 204) are similar with adjacent images inserted in adjacent placeholders (e.g., 205) in the document 100.

In another implementation, the text box 403 including the recommended device settings (or capture settings), may be displayed when the device 801 determines a focus lock. The device 801 may determine a focus lock when the shutter button is pressed halfway. The user may choose to accept the recommended settings before capturing the subsequent image. In still another implementation, the captured image may be analysed after the image has been captured to determine the relationship strength with other images in the document section and provide recommended settings to the user to increase the relationship strength.

Subject recommendation may include any form of real-time feedback displayed on the display 814. The subject recommendation may be overlayed on the live view of the scene currently being captured. In the example of FIG. 4, the frame 404 is overlayed on the live view to suggest a possible subject and composition for the subsequent (or next) image. The user may reposition the device 801 or change one or more settings, including the zoom factor, to utilise the subject recommendation represented by the frame 404. Otherwise, the user may select a "Next" icon 405 to see a next suggestion.

Other methods may be used to provide the user with real-time feedback including but not limited to augmented reality methods where information of good vantage points for image capture may be overlayed on the live view being displayed on the display 814.

Figure 5:
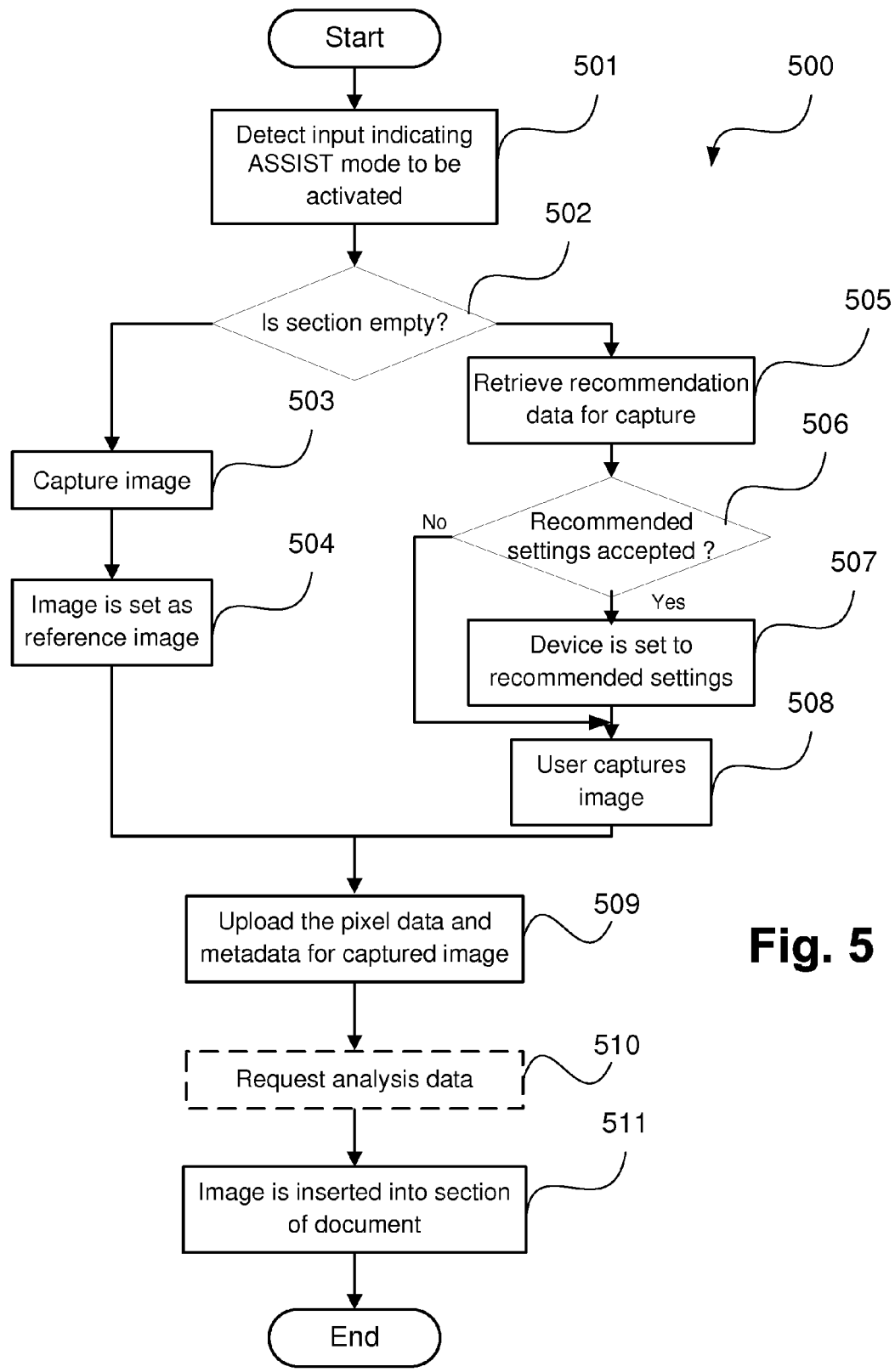
FIG. 5 is a flow diagram showing a method of populating placeholders of the document of FIG. 3.

FIG. 5 is a flow diagram showing a method 500 of populating placeholders (e.g., 101) of the document 100 as images are captured by the image capture device 801. As described herein, the method 500 is implemented as one or more software code modules of the software application program 833 resident on the storage module 809 of the image capture device 801 and being controlled in its execution by the processor 805.

Alternatively, one or more steps of the method 500 may be implemented as one or more software code modules of the software application program 933 resident on the hard disk drive 910 and being controlled in its execution by the processor 905.

A pre-condition of the method 500 being executed is that a document instance (i.e., 301) for the document 100 has been created for the user, stored in the hard disk drive 910 of the server computer module 901 and also in the storage module 809.

The method 500 begins at step 501, where the processor 805 detects an input via the user input devices 813 indicating that the ASSIST mode is to be enabled on the device 801. Also at step 501, in response to the detected input, the processor 805 may set one or more flags or the like stored in the internal storage module 809 in order to activate the ASSIST mode.

At the next step 502, if the processor 805 determines that a first section of the document 100 is empty (i.e. no user images have been inserted into the first section), then the method 500 proceeds to step 503. In the present example, the first section of the document 100 is the section 200. Otherwise, if the processor 805 determines at step 502 that the section 200 is not empty (i.e., at least the reference image captured at step 503, as described below, has been inserted into the document 100), then the method 500 proceeds to step 505.

At step 503, the processor 805 captures an image. The processor 805 captures the image in response to detection of the shutter button or one or more of the other keys of the user input devices 813 being pressed. In one implementation where the user input device 813 includes a touch sensitive panel, the processor 805 may capture the image in response to detection of a touch on the panel. For capturing the image at step 503, the device 801 may be configured by the user to operate in accordance with a first set of capture settings. The captured image is stored in the internal storage module 809.

Also at step 503, the processor 805 selects the captured image for inclusion in the document 100. The image may be selected for inclusion in the document 100 in response to the processor 805 detecting one or more inputs from the user input devices 813. For example, if the user is satisfied with the captured image then the user may select one or more keys of the keypad or icons on a touch panel to initiate selection of the captured image.

At the next step 504, the processor 805 sets the captured image as the "reference" image for the section 200. In one implementation, the user may manually assign the reference image for the section 200 from an existing collection of images stored on the internal storage module 809. The setting of the image captured at step 503 as the reference image may be indicated by a flag stored in the internal storage module 809.

As described above, if the processor 805 determines that the first section 200 of the document 100 is not empty at step 502, meaning that at least the reference image has been captured (as at step 503) and previously inserted into the document 100 (as at step 504), then the method 500 proceeds to step 505.

At step 505, the processor 805 retrieves recommendation data for capturing an image on the device 801. The recommendation data is downloaded to the device 801, from the server computer module 901, upon request by the processor 805 at step 505. As described below, the recommendation data has previously been determined, in accordance with the method 600, based on analysis of placeholders (e.g., 201) of the document 100 and the reference image captured at step 503. The determined recommendation data may be stored in the storage module 809. In the present example, the recommendation data represents a second set of capture settings which may be different to the first set of capture settings described above with reference to step 503.

As described above, the method 600 may be implemented by one or more software code modules forming the analysis engine 305. The recommendation data retrieved at step 505 may be recommendation data determined upon request of the user. For example, upon detecting a keystroke from the user input devices 813, the processor 805 may execute the method 600 to be described below. Alternatively, the recommendation data retrieved at step 505 may be recommendation data that was determined prior to step 505 when an image was previously inserted into the document 100. In one implementation, rather than being downloaded to the device at step 801, the recommendation data may have been previously determined by the processor 805 of the device 801 and stored within the storage module 809.

At the next step 506, if the processor 805 determines that the recommended capture settings have been accepted, then the method 500 proceeds to step 507. The recommended capture settings may be accepted by the user using the user input devices 813. For example, the user may press a key on the keypad to indicate acceptance of the recommended capture settings. Otherwise, if the processor 805 determines that the recommended capture settings have not been accepted, then the method 500 proceeds directly to step 508. In this instance, the device 801 will remain configured according to whatever capture settings the device 801 is currently configured.

At step 507, the processor 805 configures the device 801 according to the capture settings recommended by the recommendation data (i.e., in accordance with the second set of capture settings). Then at the next step 508, the processor 805 performs the step of capturing an image. The image is captured at step 508 in accordance with whichever capture settings the device 801 has been configured, which may be the second set of capture settings defined by the recommendation data if the second set of capture settings were accepted at step 506. The captured image is stored in the internal storage module 809. As at step 503, at step 508, the processor 805 captures the image in response to detection of the shutter button or one or more of the other keys or displayed icons of the user input devices 813 being pressed. Also at step 508, the processor 805 selects the image captured at step 508 for inclusion in the document 100 as at step 503.

Then at the next step 509, the processor 805 uploads the pixel data and metadata (e.g. camera settings, geo-location, Exchangeable Image File (EXIF) data, tags, annotations) of the captured image (i.e., the reference image captured at step 503 or the image captured at step 508) to the server computer module 901 hosting the instance 301 for the document 100. Accordingly, in an initial execution of the method 500, the processor 805 uploads the pixel data and metadata for the reference image captured at step 503.

Upon receiving the pixel data and metadata for the reference image captured using the image capture device 801 at step 503 or the image captured at step 508, the pixel data and metadata for the captured image may be stored within the memory 906 of the server computer module 901 by the processor 905. As will be described in detail below, the analysis engine 305 executing within the server computer module 901 will analyse the captured reference image and a next empty placeholder in the document 100 in order to generate new recommendation data. The reference image is analysed in accordance with the method 600. Accordingly, as described below, the method 600 is executed upon the processor 905 receiving the pixel data and metadata for the captured reference image. The method 600 is also executed each time the processor 905 receives the pixel data and metadata for the image captured at step 508, as will be described in detail below.

In one implementation, the method 500 proceeds directly to step 511 and concludes at step 511, where the processor 805 performs the step of inserting the captured image into the document 100, by populating a placeholder (e.g., 201) of the document 100 with the captured image. If the captured image has been set as the reference image at step 504, then at step 510 the reference image is inserted into a placeholder (e.g., 205) of the document 100 designated as the reference image placeholder. Otherwise, the captured image is inserted into a next empty placeholder (i.e., at least one remaining placeholder in the document 100) in a sequence defined by the document template for the document 100. The placeholder 205 into which the reference image is inserted may be predefined for the reference image, for example, by a designer of the document 100.

Alternatively, as described below, in one implementation, the method performs step 510 (as shown by phantom lines) prior to step 511.

The method 500 may be repeated until the section 200 is complete. Alternatively, the method 500 may be repeated until the ASSIST mode is disabled on the device 801, for example, by the user.

Figure 6:
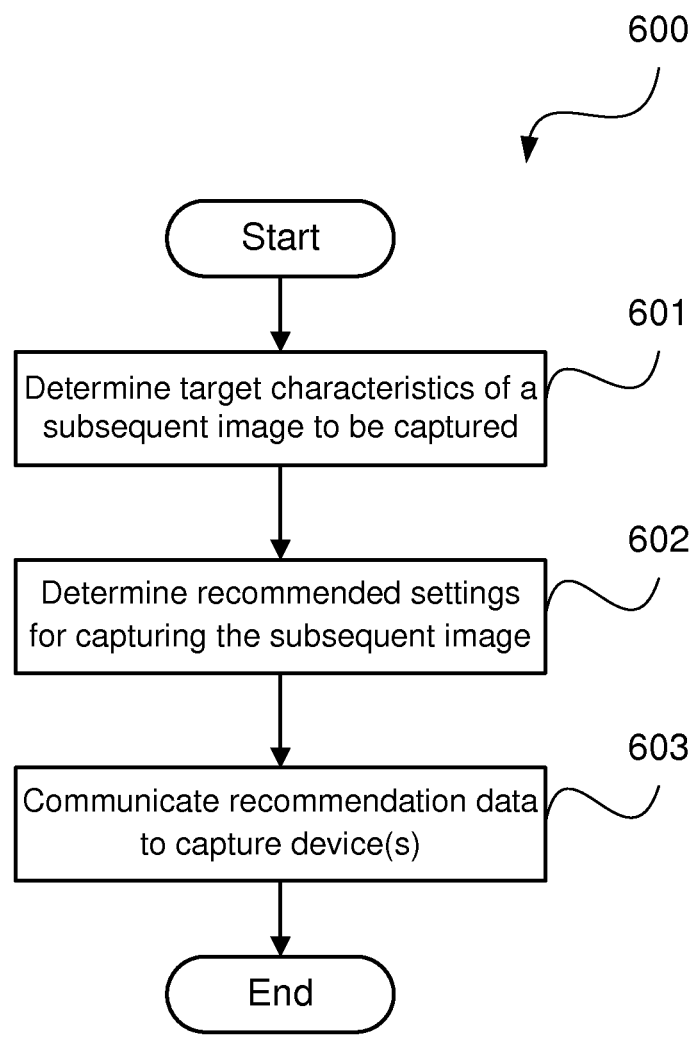
FIG. 6 is a flow diagram showing a method of determining recommendation data.

The method 600 of determining recommendation data will now be described with reference to FIG. 6. The method 600 may be implemented as one or more software code modules of the software application program 933 resident on the hard disk drive 910 of the computer module 901 and being controlled in their execution by the processor 905. As described above, the code modules of the software application program 933 performing the analysis may form the analysis engine 305 as shown in FIG. 3. Alternatively, one or more steps of the method 600 may be implemented as one or more software code modules of the software application program 833 resident within the storage module 809 and being controlled in their execution by the processor 805.

The method 600 determines recommendation data that is communicated to the device 801. A precondition of executing the method 600 is that the reference image has been inserted into the document 100 at step 511 after being captured at step 503. Accordingly, in an initial execution of the method 600, recommendation data is determined for the image to be captured at step 508 of the method 500 following the image captured at step 503 being set as the reference image at step 504. In particular, the method 600 is executed by the processor 905 at the time the processor 905 receives the pixel data and metadata for the reference image captured at step 503, as uploaded to the server computer module 901 at step 509. The method 600 is also executed by the processor 905 each time the processor 905 receives the pixel data and metadata for the image captured at step 508, as uploaded to the server computer module 901 at step 509 in a subsequent execution of the method 500.

For ease of explanation, the image to be captured at step 508 (i.e., following the image captured at step 503 being set as the reference image at step 504) will be referred to below as the "subsequent image".

The method 600 begins at step 601, where the processor 905 performs the step of determining target characteristics of the subsequent image to be captured using the image capture device 801. As described in detail below, the target characteristics are determined based on characteristics of the reference image and characteristics of at least one remaining placeholder in the document 100. Typically, the at least one remaining placeholder is the next empty placeholder in the document 100. The characteristics of the at least one remaining placeholder include the weighted parameter values assigned to the at least one remaining placeholder and defining the special relationship strength between the placeholders of the document 100, as described above with reference to FIG. 2B.

In particular, at step 601, the processor 905 retrieves metadata from the reference image (i.e., the image captured at step 503 and set as the reference image at step 504 before being uploaded at step 509) of the current section 200. The metadata may include 1) Exchangeable Image File (EXIF) data generated by the device 801; 2) user-generated data such as tags and annotations; and 3) post-capture metadata such as recognised faces. The metadata associated with the reference image may also include the set of capture settings (i.e., the first set of capture settings) used to capture the reference image as at step 503 of the method 500. Accordingly, the set of capture settings used to capture the reference image may be stored in the metadata associated with the reference image.

The metadata for the reference image may be retrieved at step 601 from the hard disk drive 910 or memory 906 of the server computer module 901 where the reference image is stored. The processor 905 also analyses the retrieved metadata at step 601. From an analysis of the metadata, the processor 905 determines similarity parameters.

The similarity parameters determined at step 601 are of a form depending on how the server computer module 901 is configured to determine whether or not images are similar based on characteristics of the images. For example, the processor 905 may determine that the subsequent image will be similar to the reference image based on colour variation characteristics between the reference image and the subsequent image. In this instance, the similarity parameter may be a value representing a threshold amount of colour variation.

In another example, facial recognition may be applied to the reference image at step 601 in order to determine face recognition characteristics, such as faces recognised in the reference image. In this instance, the similarity parameter may be a value representing a number of faces recognised in the reference image.

As another example, the processor 905 may determine that the subsequent image will be similar to the reference image based on location characteristics, such as location of where the reference image was captured. In this instance, the similarity parameter may be geo-location coordinates generated by a global positioning system (GPS) device.

The similarity parameters used in the method 600 may be configured so that a particular parameter may be compared using an ordinal scale. For example, colour variation may be determined based on colour histograms and recognised faces may be determined using facial recognition algorithms. Further, location may be determined based on geo-location coordinates generated by a global positioning system (GPS) device, as described above.

Also at step 601, the processor 905 retrieves the weighted parameter values defined for the document template corresponding to the document 100. The processor 905 retrieves the weighted parameter values from the document template database 302. The weighted parameter values are determined relative to the reference image, as described above with reference to FIG. 2b.

At the next step 602, the processor 905 performs the step of determining a set of capture settings for the image capture device 801 based on the target characteristics determined at step 601. In an initial execution of the method 600, the set of capture settings determined at step 602 will be a second set of capture settings following the first set of capture settings used to capture the image at step 502. In a subsequent execution of the method 600, the set of capture settings determined at step 602 will be a third or further set of capture settings following the previous set of capture settings used to capture the image at step 508.

In particular, at step 602, the weighted value for a specified placeholder (e.g., 101) in combination with the determined similarity parameters are used to determine recommendation data (i.e., defining recommended capture settings) for the device 801. In the present example, the specified placeholder is a next empty placeholder in the document 100 after the reference image has been inserted into the document 100 as at step 510 of the method 500. Further, in the present example, the recommendation data determined at step 603 recommends how the device 801 should be set to capture the subsequent image (i.e., as at step 508) which is to be inserted into the specified placeholder.

At step 603, the processor 905 performs the step of communicating recommendation data, defining the second set of capture settings (or third/further set of capture settings) determined at step 602, to the image capture device 801. The recommendation data is communicated to the device 801 in order to enable the device 801 to capture the subsequent image in accordance with the second set of capture settings. The settings defined by the recommendation data may be stored in the internal storage module 809 before being displayed on the display 814 in a text box (e.g., 403) in a similar manner to FIG. 4.

In one implementation, the weighted parameter value for a specified placeholder defines recommended settings for ensuring similarity between the reference image and the subsequent image to be captured and inserted into the specified placeholder. For example, an ordinal scale from one (1) to five (5), where five (5) represents the maximum weighted value, may be used to denote the strongest relationship and strongest similarity between the specified placeholder and the reference image placeholder 205. In this instance, a placeholder with weighted value of five (5) specifies that all faces recognised in the reference image should appear in the subsequent image to be captured and inserted into the specified placeholder.

In addition, the recommendation data may define that colour variation between the reference image and the subsequent image to be captured, should not exceed a maximum threshold. In order to maintain colour variation, certain device settings used to capture the reference image should be preserved for capturing the next image. For example, the white balance setting used to capture the reference image should remain the same for capturing the subsequent image. Further, in order to maintain colour variation, the flash setting used to capture the reference image should be maintained for capturing the subsequent image. The combination of capture settings required to produce a desired effect in the subsequent image to be captured may be determined provided that knowledge of image processing and capabilities of the device 801 is available (i.e., the image processing and capabilities stored on the hard disk drive 910 of the server computer module 901 in the present example).

Using the ordinal scale described above, a weighted value of four (4) for the specified placeholder indicates a lower threshold for image similarity between the reference image and the subsequent image to be captured and inserted into the specified placeholder. In this instance, the recommendation data determined in accordance with the method 600 will be less restrictive on device settings to be used and on which subject to capture. In one arrangement, a placeholder with a weighted value of four (4) specifies that at least one of the faces recognised in the reference image should appear in the image to be inserted into the placeholder. Furthermore, the colour variation may have a higher maximum threshold than the value as specified for a weighted value of five (5).

A lookup table may be stored in memory 906 of the server computer module 901, which contains the code mapping between weighted values and the set of rules that specify the requirements for each weighted value. The lookup table may be sent to the capture device 801 and stored in memory 809 on the capture device 801. The recommendation data prepared by the server computer module 901 in accordance with the method 600 will describe the conditions for satisfying the requirements for each of the weighted values in the lookup table. From the example above, a weighted value of five (5) may contain the rule that all faces recognised in the reference image must appear in the placeholder with the same weighted value. The recommendation data in this case will consist of the set of recognised faces in the reference image.

For colour variation, the recommendation data may may include the ISO setting used to capture the reference image as well as the colour histogram of the reference image, so that the capture device 801 may dynamically determine similarity against a required threshold (as stated in the rule). By using information available about the image processing and capabilities of the capture device 801, the analysis engine 305 may determine tolerance level for variations introduced by using a flash on the capture device 801, changing the white balance setting and changing the ISO level. Such information may be used by the capture device 801 to vary the settings to satisfy similarity requirements when an original recommended setting (e.g. ISO level) is not appropriate.

In still another implementation, similarity between the reference image and the subsequent image to be captured may be based on a cumulative score that accounts for all attributes (e.g., colour variation, recognised faces and location) that can be used to define such similarity. In this instance, an algorithm may be used to determine different combinations of device settings that will achieve at least the determined minimum score allowed for the desired relationship strength between two images. For example, the lookup table of the above example may be implemented as a set of rules with corresponding scores. In this instance, each recognised face from the reference image that is detected in a subsequent image will increase the relationship strength by a fixed amount. The fixed amount needs to be balanced against the total number of faces recognised in the reference image. For colour variation, the score added to the relationship strength will increase inversely with the magnitude of the variation. By utilizing such a method for relationship strength determination, the capture device 801 may more dynamically suggest recommendation data by calculating the score through the live view image of the capture device 801. The capture device 801 may also suggest from the set of rules some possible actions that would increase the score by the required amount to meet the target relationship strength.

The methods 500 and 600 will now be further described by way of example. In particular, in one example, a reference image may be captured and inserted into document 100 in the reference image placeholder 205, in accordance with the method 500. Facial recognition may be applied to the reference image, as at step 601, resulting in six (6) recognised faces within the reference image. The processor 905 may then determine that the next empty placeholder (e.g., 204) for calculating recommendation data has a weighted value of four (4). To ensure that the subsequent image achieves a weighted value of four (4), an algorithm may be used to determine a combination of capture settings recommendation data and subject recommendation data producing an image of at least a weighted value of four (4). Such an algorithm may be based on pre-determined scale parameters for rating similarity. For instance, to achieve a weighted scale of three (3) the subsequent image may be required to have at least one (1) recognised face present in the reference image. To increase the weighted value to a four (4), the colour ratio of the subsequent image may be required to not exceed a variation of 40%, for example.

Continuing the example immediately above, the capture settings retrieved from the reference image metadata may indicate that the flash was not used, the white balance was set to "Cloudy", the ISO setting was 400, and the metering mode was set to "Evaluative". Based on the requirements for colour ratio, the algorithm may determine that by utilising the same flash setting, white balance and ISO of the reference image the resulting colour ratio will be no more than 40%. Hence, the capture settings and the recognised faces are sent back to the device 801 and displayed on the video display 814. When the user points the device 801 at a subject (e.g. faces) the device 801 retrieves the subject recommendation data determined in accordance with the method 600 (in real time) and provides a suggested frame composition for the image 404. In this case, the device 801 has recognised at least one face belonging to the group in the reference image and includes the recognised face in the suggested frame composition.

In one implementation, at step 510 (as shown in phantom lines), the processor 805 may request analysis data from the processor 905 of the server computer module 901. In this instance, upon receiving the request from the processor 805, the processor 905 of the server computer module 901 performs the step of analysing the subsequent image captured at step 508. The subsequent image is analysed to determine if the subsequent image is to be inserted into the next empty placeholder (e.g., 201) in the sequence defined by the document template for the document 100 or into another placeholder (e.g., 204) of the document 100. In particular, the processor 905 may analyse the metadata (i.e., EXIF data, tags, annotations, recognised faces) associated with the subsequent image and compare the subsequent image metadata with the metadata of the reference image. The result of the comparison may be a relationship value indicating a relationship between the reference image and the subsequent image. The determined relationship value may be communicated back to the image capture device 801 and stored in the storage module 809. Accordingly, at step 511 as described above, if the captured image is determined by the processor 805 to have a stronger relationship (e.g., as represented by a greater relationship value) with the reference image than a previously inserted image, then the processor 805 of the device 801 may perform a re-layout of the images within the placeholders of the document 200. The subsequent image may then be inserted into another placeholder of the document 100 at step 511 rather than the next empty image placeholder.

Figure 7:
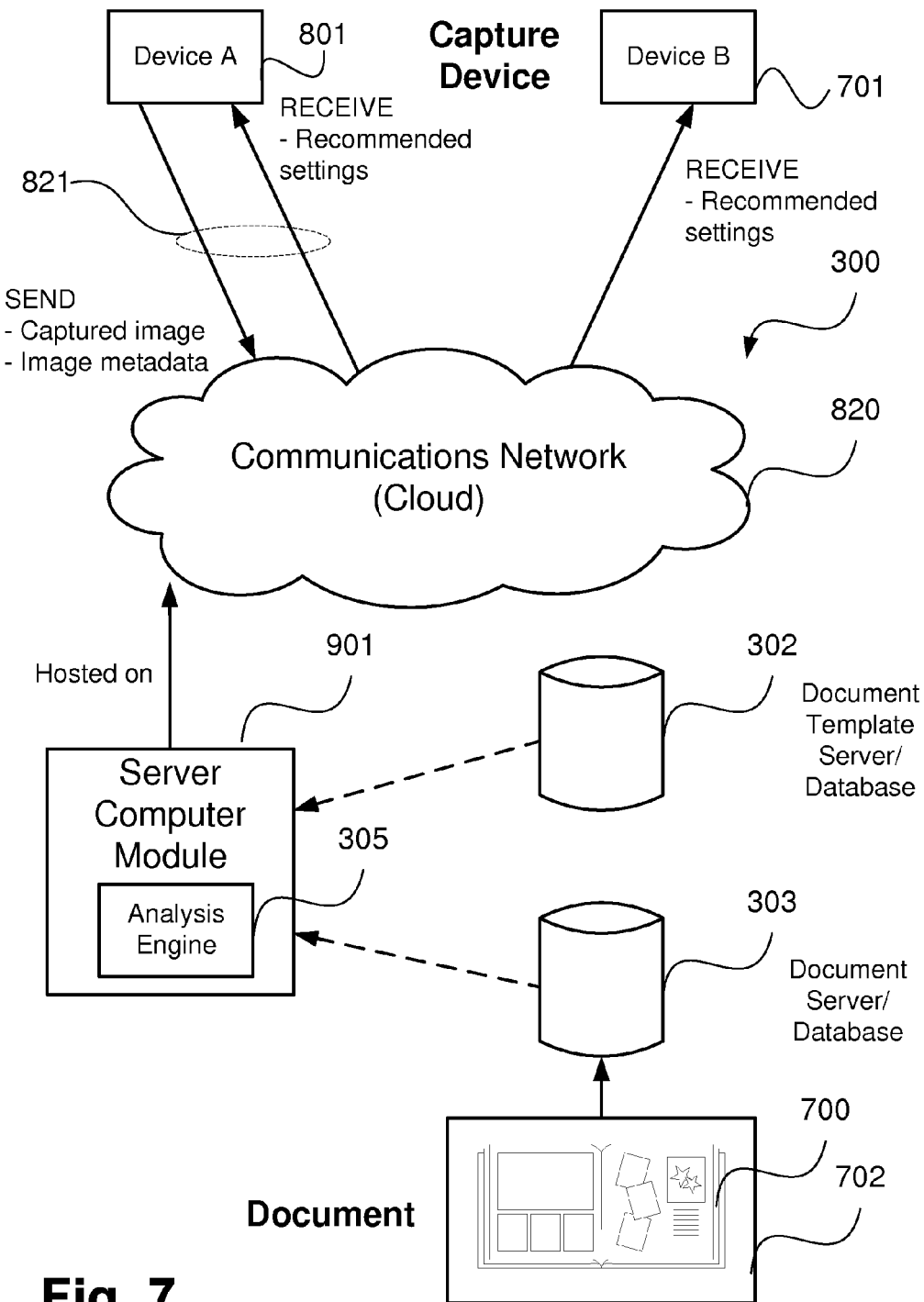
FIG. 7 is a schematic block diagram showing the system of FIG. 3 in accordance with another example where multiple users are editing a single document.

FIG. 7 shows the system 300 in another example where multiple users are editing a single document. In the example of FIG. 7, at least two users each with their own image capture device 801 and 701 are connected to the communications network 820. The device 701 has a similar configuration to the device 801 as described above.

Continuing the example, a first user using the device 801 creates a document 700 on the system 300, in a similar manner to the document 100 described above, and notifies the user of the device 701 (i.e., a second user) that the document 700 has been created. The notification may be in the form of a text message sent from the device 801 to the device 701. The notification may also request that the second user join a session that involves editing and completing the document 100. Alternatively, the second user using the device 701 may request to join the session.

The document 700 is similar to the document 100 and is derived from a document template residing in the document template server 302. The document 700 is subsequently stored in the document server database 303. A document instance for the document 700 is sent to both the device 801 and the device 701 for preview by the first user and the second user, respectively. All modifications to the document instance sent to the device 701 and 801 will be synchronized with the document 700 stored in the document server database 303. As there are multiple users editing the single document 700, the system 300 is configured to ensure integrity as a result of the shared access. For example, the first user may use the user input device 813 of the device 801 to lock a section of the document 700 for editing before making changes to the document 700 in order to avoid the second user from editing the same section of the document 700.

Continuing the example of FIG. 7, the first user captures an image on the image capture device 801, as at step 503, and the pixel data and metadata of the captured image is uploaded to the server computer module 901 hosting the document instance for the document 100. The pixel data and metadata for the captured image may be stored in the memory 906 of the server computer module 901. The server computer module 901 receiving the captured image retrieves a stored document instance 702 for the document 100 from the document template server 302.

The server computer module 901 performs analysis on the reference image and a next empty (or available) placeholder, in accordance with the method 600, to determine where the image captured by the first user is to be inserted in the document 100. As described above, the code modules of the software application program 933 implementing the method 600 may be referred to as the analysis engine 305 as shown in FIG. 7. The processor 905 of the server computer module 901 sends a notification to each of the devices 801 and 701 to notify the first and second user, respectively, that a placeholder (e.g., 101) in the document 100 has been filled. Each of the devices 801 and 701 may also display a preview of the document 100, including the newly inserted image, on each of the devices 801 and 701. Based on the analysis of the reference image captured by the first user, the server computer module 901 determines recommendation data to be sent to the devices 801 and 701. The recommendation data may be displayed on the devices 801 and 701, in the form of the text box 403, for example. The recommendation data recommends capture settings for the devices 801 and 701, for capturing a subsequent image for a next empty placeholder in the document 100.

The two devices 801 and 701 may be of a different type and/or configuration. In this instance, a plurality of sets of capture settings may be determined In particular, one set of capture settings may be determined for the device 801 and another set of capture settings may be determined for the device 701. The plurality of capture settings may be represented by the same set of recommendation data or a different set of recommendation data. Further, if an image captured with one of the plurality of sets of capture settings is received by the processor 905 (as at step 509), then the processor 905 may perform the step of communicating information about the one set of capture settings to one or more of the image capture devices (e.g., 701, 801) connected to the network 820. For example, if an image captured by the device 801, in accordance with one of the plurality of sets of capture settings, is received by the processor 905 (as at step 509), then the processor 905 may perform the step of communicating information about the set of capture settings used by the device 801 to a similar image capture device connected to the communications network 820. Communicating such information to the similar image capture device enables the similar image capture device to capture an image in accordance with the capture settings used by the device 801.

In one implementation, an empty placeholder (e.g., 101) in the document 100 may be selected and locked by a user using the user input devices 816, for example, for editing in order to avoid other users from inserting a captured image in the locked placeholder while editing of the document 100 is taking place.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of" variations of the word "comprising", such as "comprise" and "comprises" have correspondingly varied meanings.

The invention claimed is:

1. A method of populating a placeholder of a document as images are captured by at least two image capture devices, said method comprising:
    receiving a reference image captured using a first image capture device configured to operate in accordance with a first set of capture settings;
    inserting the reference image into a placeholder of a document;
    determining target characteristics of a subsequent image to be captured using a second image capture device, the target characteristics being determined based on characteristics of the reference image and characteristics of at least one remaining placeholder in the document;
    determining a second set of capture settings for the second image capture device based on the determined target characteristics;
    communicating the second set of capture settings to the second image capture device in order to enable the second image capture device to capture the subsequent image in accordance with the second set of capture settings; and
    populating a placeholder of the document with the subsequent image.

2. The method according to claim 1, where the placeholder into which the reference image is inserted may be pre-defined for the reference image.

3. The method according to claim 1, where the characteristics of the reference image include facial recognition applied to the image.

4. The method according to claim 1, where the characteristics of a placeholder may be pre-defined.

5. The method according to claim 1, where the first set of capture settings are stored in metadata associated with the reference image.

6. The method according to claim 1, where characteristics of the at least one remaining placeholder include a parameter value defining a special relationship strength between the placeholders of the document.

7. The method according to claim 1, further comprising receiving and inserting the subsequent image, captured in accordance with the second set of capture settings, into the at least one remaining placeholder.

8. The method according to claim 1, where a plurality of sets of capture settings are determined.

9. The method according to claim 8, wherein if an image with one of the plurality of sets of capture settings is received, communicating information about the one set of capture settings to the second image capture device in order to enable the second image capture device to capture an image in accordance with the capture settings for the received image.

10. The method according to claim 1, wherein the second image capture device is automatically configured to capture at least the second image in accordance with the second set of capture settings.

11. An apparatus for populating a placeholder of a document as images are captured by at least two image capture devices, said apparatus comprising:
- means for receiving a reference image captured using a first image capture device configured to operate in accordance with a first set of capture settings;
- means for inserting the reference image into a placeholder of a document;
- means for determining target characteristics of a subsequent image to be captured using a second image capture device, the target characteristics being determined based on characteristics of the reference image and characteristics of at least one remaining placeholder in the document;
- means for determining a second set of capture settings for the second image capture device based on the determined target characteristics;
- means for communicating the second set of capture settings to the second image capture device in order to enable the second image capture device to capture the subsequent image in accordance with the second set of capture settings; and
- populating a placeholder of the document with the subsequent image.

12. A system for populating a placeholder of a document as images are captured by at least two image capture devices, said system comprising:
- a memory for storing data and a computer program;
- a processor coupled to said memory for executing said computer program, said computer program comprising instructions for:
    - receiving a reference image captured using a first image capture device configured to operate in accordance with a first set of capture settings;
    - inserting the reference image into a placeholder of a document;
    - determining target characteristics of a subsequent image to be captured using a second image capture device, the target characteristics being determined based on characteristics of the reference image and characteristics of at least one remaining placeholder in the document;
    - determining a second set of capture settings for the second image capture device based on the determined target characteristics;
    - communicating the second set of capture settings to the second image capture device in order to enable the second image capture device to capture the subsequent image in accordance with the second set of capture settings; and
    - populating a placeholder of the document with the subsequent image.

13. A non-transitory computer readable medium having a computer program stored thereon for populating a placeholder of a document as images are captured by at least two image capture devices, said program comprising:
- code for receiving a reference image captured using a first image capture device configured to operate in accordance with a first set of capture settings;
- code for inserting the reference image into a placeholder of a document; code for determining target characteristics of a subsequent image to be captured using a second image capture device, the target characteristics being determined based on characteristics of the reference image and characteristics of at least one remaining placeholder in the document;
- code for determining a second set of capture settings for the second image capture device based on the determined target characteristics;
- code for communicating the second set of capture settings to the second image capture device in order to enable the second image capture device to capture the subsequent image in accordance with the second set of capture settings; and
- code for populating a placeholder of the document with the subsequent image.

\* \* \* \* \*